US006327207B1

(12) United States Patent
Sluiter et al.

(10) Patent No.: US 6,327,207 B1
(45) Date of Patent: Dec. 4, 2001

(54) SYNCHRONIZING DATA OPERATIONS ACROSS A SYNCHRONIZATION BOUNDARY BETWEEN DIFFERENT CLOCK DOMAINS USING TWO-HOT ENCODING

(75) Inventors: David O. Sluiter, Boulder; Robert W. Moss, Longmont, both of CO (US)

(73) Assignee: LSI Logic Corporation, Milpitas, CA (US)

(*) Notice: Subject to any disclaimer, the term of this patent is extended or adjusted under 35 U.S.C. 154(b) by 0 days.

(21) Appl. No.: 09/829,377

(22) Filed: Apr. 9, 2001

(51) Int. Cl.[7] ........................................ G11C 7/00
(52) U.S. Cl. .................... 365/221; 365/233; 365/239; 365/189.07
(58) Field of Search ...................... 365/221, 233, 365/236, 239, 189.07

(56) References Cited

U.S. PATENT DOCUMENTS 5,426,756  6/1995  Shyi et al. ........................ 711/159
5,841,722 * 11/1998  Willenz ............................ 365/221
6,097,655 *  8/2000  Kessler ............................ 365/221
6,246,257 *  6/2001  Kawahara ......................... 326/38

OTHER PUBLICATIONS

Peter Alfke, "Moving Data Across Asynchronous Clock Boundaries", 2000 Integrated System Design, 6 pages.

* cited by examiner

Primary Examiner—Andrew Q. Tran (57) ABSTRACT

A digital logic circuit, such as a FIFO memory includes pointers, or indicators, generated in two clock domains, between which information is transferred, to indicate a location in the digital logic circuit for transferring the information into or out of the digital logic circuit within either clock domain. Each pointer is encoded with a "2-hot" encoded value within one of the clock domains. The 2-hot encoded value of each pointer is sent to the other clock domain to synchronize the pointer to the other clock domain as well as to its original clock domain. Within each clock domain, the pointer generated therein and the pointer received from the other clock domain are used to determine whether the information can be transferred into or out of the digital logic circuit.

20 Claims, 5 Drawing Sheets

| ACTUAL FIFO LOCATION | 2-HOT ENCODED VALUE |
|---|---|
| 0 | 11000 |
| 1 | 01100 |
| 2 | 00110 |
| 3 | 00011 |
| 4 | 10001 |

| 2-HOT ENCODED VALUE | 1-HOT ENCODED VALUE |
|---|---|
| 11000 | 10000 |
| 01100 | 01000 |
| 00110 | 00100 |
| 00011 | 00010 |
| 10001 | 00001 |

| INPUT TO FILTER | OUTPUT FROM FILTER |
|---|---|
| 11000 | 11000 |
| 11001 | 11000 |
| 10000 | 11000 |
| 01100 | 01100 |
| 11100 | 01100 |
| 01000 | 01100 |
| 00110 | 00110 |
| 01110 | 00110 |
| 00100 | 00110 |
| 00011 | 00011 |
| 00111 | 00011 |
| 00010 | 00011 |
| 10001 | 10001 |
| 10011 | 10001 |
| 00001 | 10001 |

FIG._8

SYNCHRONIZING DATA OPERATIONS ACROSS A SYNCHRONIZATION BOUNDARY BETWEEN DIFFERENT CLOCK DOMAINS USING TWO-HOT ENCODING

FIELD OF THE INVENTION

This invention relates to digital logic circuits. More particularly, the present invention relates to a new and improved digital logic circuit, such as a first-in-first-out (FIFO) memory, incorporating a 2-hot encoding method for synchronizing operations across a synchronization boundary between two different clock domains in the digital logic circuit.

BACKGROUND OF THE INVENTION

Digital logic circuits must sometimes coordinate operations across a synchronization boundary between two different clock domains operating at different clock speeds. In particular, a first-in-first-out (FIFO) memory is sometimes used to transfer data, commands and/or other information between the two different clock domains. Data is stored into the FIFO memory in a "write" clock domain at a write clock speed and read from the FIFO memory in a "read" clock domain at a read clock speed.

A FIFO memory write pointer, typically a register, is maintained in the write clock domain to point to the FIFO memory location in which data can be stored into the FIFO memory. A FIFO memory read pointer, also typically a register, is maintained in the read clock domain to point to the FIFO memory location from which data can be read from the FIFO memory. The FIFO memory read pointer and the FIFO memory write pointer are compared to each other to generate status information for the FIFO memory. Typically, the status information includes an "empty" signal which indicates that all FIFO memory locations are empty, or do not contain valid data. A "full" signal indicates that all FIFO memory locations are full, or contain valid data. The empty signal is used to determine whether data can currently be read from the FIFO memory. The full signal is used to determine whether data can currently be added to the FIFO memory.

Using the full and empty signals, a synchronization mechanism is implemented in the FIFO memory to prevent "overrun" and "underrun" conditions when writing to and reading from the FIFO memory. An overrun condition occurs when data is added to a FIFO memory location and overwrites previous data that has not yet been read from that FIFO memory location. An underrun condition occurs when data is read from a FIFO memory location before valid data has been stored into that FIFO memory location. The FIFO memory operations are typically synchronized by passing "handshaking" signals between the write clock domain and the read clock domain to request, acknowledge and reject data operations on the FIFO memory.

When there is data to be added to the FIFO memory, a "write request" handshaking signal is initiated in the write clock domain as a request directed to the read clock domain for permission to write data into the FIFO memory. The write request handshaking signal includes the value of the write pointer from the write clock domain and the data to be stored into the FIFO memory. A "return" handshaking signal from the read clock domain is either an "acknowledgment" or a "rejection" depending upon the status of the FIFO memory at the time of the write request. To determine the status of the FIFO memory, the value of the write pointer in the handshaking signal received in the read clock domain is compared to the value of the read pointer in the read clock domain to determine whether the FIFO memory is full. If the FIFO memory is full, the return handshaking signal is a rejection. If the FIFO memory is not full, the data is stored into the FIFO memory and the return handshaking signal is an acknowledgment.

Before data is read from the FIFO memory, a "read request" handshaking signal is initiated by the read clock domain as a request directed to the write clock domain for permission to read data from the FIFO memory. The read request handshaking signal includes the value of the read pointer from the read clock domain. A return handshaking signal from the write clock domain forms an acknowledgment or rejection depending upon the status of the FIFO memory at the time of the read request. To determine the status of the FIFO memory, the value of the read pointer in the handshaking signal received in the write clock domain is compared to the value of the write pointer in the write clock domain to determine whether the FIFO memory is empty. If the FIFO memory is empty, the return handshaking signal is a rejection. If the FIFO memory is not empty, data is read from the FIFO memory and included in the return handshaking signal, which is an acknowledgment.

The handshaking signals pass through a series of synchronizer flip-flops which are clocked by the clock domain that receives the handshaking signal. The round-trip handshake may take several clock cycles to complete depending on the number of synchronizer flip-flops in each clock domain. Accordingly, a read or write of the FIFO memory cannot be done on every clock cycle in the respective clock domain because it takes several cycles for the handshake to complete.

A FIFO memory can be implemented which allows data operations to occur in two different clock domains without handshaking signals. The contents of the FIFO memory read pointer and the FIFO memory write pointer are made available in both clock domains to generate the full signal in the write clock domain and the empty signal in the read clock domain. The full signal is typically set when the value in the FIFO memory read pointer is greater than the FIFO memory write pointer by a quantity of one. In other words, the full signal is set when incrementing the value in the FIFO memory write pointer would result in a quantity that is the same as the value in the FIFO memory read pointer. The empty signal is set when the FIFO memory read pointer and the FIFO memory write pointer contain the same FIFO memory location value. The contents of the FIFO memory read pointer must be synchronized to the clock domain in which data is stored to the FIFO memory and the contents of the FIFO memory write pointer must be synchronized to the clock domain in which data is read from the FIFO memory. If either pointer is not properly synchronized to the other respective clock domain, an indeterminate value may be clocked into the clock domain while the value in the pointer transitions from one value to another. As a result, the full or empty signals derived from the value clocked into the clock domain may be invalid.

The FIFO memory location values in the FIFO pointers are typically encoded using "gray code" to facilitate synchronization between the clock domains. Gray code involves encoding binary values in a manner in which only one bit in the binary value changes as the gray code value is incremented or decremented. Thus, if the gray code value is clocked into one of the clock domains while the gray code value is being incremented or decremented, only one binary bit may have an indeterminate value, which can generally be easily accounted for. Typically, one or more flip-flop registers are used to synchronize the gray code value in the clock domain and to resolve the value of the changing bit. The synchronized gray code value formed in the clock domain will be either the previous gray code value or the new incremented, or decremented, gray code value. In either case, the gray code value is valid and synchronized in the clock domain.

Synchronizing the FIFO memory between two clock domains by using handshaking signals does not allow data to be added to the FIFO memory during each write clock cycle or read from the FIFO memory during each read clock cycle. Encoding FIFO memory location values using gray code requires an even number of FIFO memory locations to ensure that only one bit in the binary representation of the location value changes when the location value is incremented or decremented. If a FIFO memory with an odd number of locations is desired, the FIFO memory may contain an extra location that is unneeded. The extra location will consume area on an integrated circuit and may decrease performance of the FIFO memory by increasing interconnect length, capacitive loading, or other characteristics of the integrated circuit.

It is with respect to these and other background considerations that the present invention has evolved.

SUMMARY OF THE INVENTION

One aspect of the present invention relates to a digital logic circuit, such as a FIFO memory, that uses an encoding scheme, such as a "2-hot" encoding scheme, to synchronize the operation of the digital logic circuit between two different clock domains without using handshaking signals. Information can preferably be stored into the digital logic circuit during every clock cycle of one clock domain and read from the digital logic circuit during every clock cycle of the other clock domain. Additionally, the digital logic circuit preferably has any number of locations and is not limited to a size that is a multiple of two.

The encoding scheme preferably includes two encoded values (e.g. an odd or even number of 2-hot encoded bits), one in each clock domain, that each use two bits to indicate the locations in the digital logic circuit at which the information can be added to the digital logic circuit in one clock domain and read from the digital logic circuit in the other clock domain. Each bit pair of the encoded values preferably corresponds to one location in the digital logic circuit, and the total number of bits in each encoded value equals the total number of locations in the digital logic circuit. When switching to a new location at which the information can be added to or read from the digital logic circuit, in the encoded value that corresponds to the changing location, one of the two bits changes logic states, the other bit (an "anchor" bit) remains unchanged, and one of the remaining bits in the encoded value changes logic states to join the unchanged bit to form two new bits to indicate the new, or next, location for adding or reading the information in the digital logic circuit.

Each encoded value is also supplied to the other one of the clock domains. In the other clock domain, the encoded value is preferably synchronized and compared to the other encoded value to determine whether the information can be added to or read from the digital logic circuit. Having one of the two bits remain unchanged during switching to the next location ensures that the digital logic circuit can always regenerate the encoded value in the other clock domain even when the two bits that change their logic states are still transitioning between logic states. In this manner, the comparison of the two encoded values in each clock domain for determining whether the information can be added to or read from the digital logic circuit can occur on every clock cycle in both clock domains. Thus, the information can potentially be added to or read from the digital logic circuit on every clock cycle of both clock domains as long as there is available space for adding the information or available information for reading.

A more complete appreciation of the present invention and its improvements can be obtained by reference to the accompanying drawings, which are briefly summarized below, by reference to the following detailed description of a presently preferred embodiment of the invention, and by reference to the appended claims.

DETAILED DESCRIPTION

Figure 1:
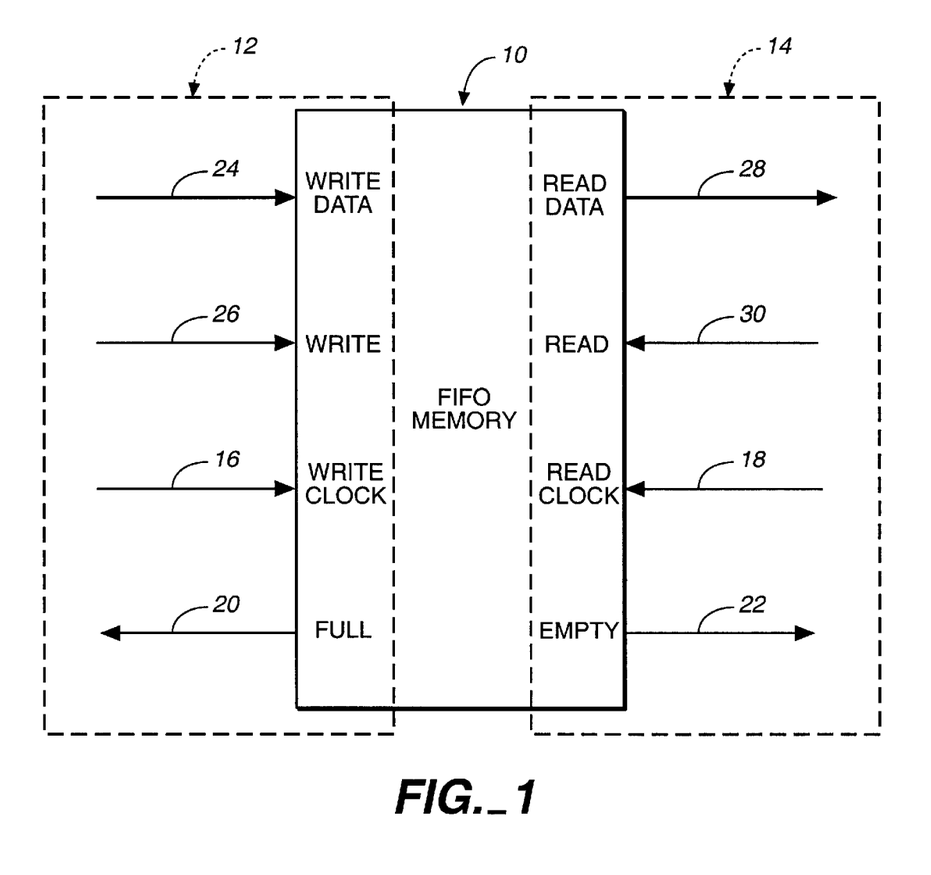
FIG. 1 is a block diagram of a first-in-first-out (FIFO) memory incorporating the present invention.

The present invention is preferably incorporated into a digital logic circuit, such as a FIFO memory 10, as shown in FIG. 1. The FIFO memory 10 operates in two independent clock domains 12 and 14, a write clock domain 12 in which data is stored into the FIFO memory 10 and a read clock domain 14 in which data is read from the FIFO memory 10. The FIFO memory 10 operates to transfer information across a "synchronization boundary" between the two clock domains 12 and 14. The write clock domain 12 is established by a write clock signal 16 which is used to synchronize the operation of storing data into the FIFO memory 10. The read clock domain 14 is established by a read clock signal 18 which is used to synchronize the operation of reading data from the FIFO memory 10.

Data is stored into the FIFO memory 10 during a write clock cycle established by the write clock signal 16. Data is read from the FIFO memory 10 during a read clock cycle established by the read clock signal 18. The write clock signal 16 and the read clock signal 18 may have different frequencies and operate asynchronously of each other.

The status of the FIFO memory 10 is indicated by a "full" signal 20 generated in the write clock domain 12 and by an "empty" signal 22 generated in the read clock domain 14. The full and empty signals 20 and 22 prevent an attempt to write the data to the FIFO memory when there is no available storage space (an "overrun" condition) and prevent an attempt to read the data from the FIFO memory when there is no available data (an "underrun" condition). A "2-hot" encoding method is used to synchronize internal signals (see FIG. 2 below) within the FIFO memory 10 in order to generate the full signal 20 and the empty signal 22.

The data is properly stored into the FIFO memory 10 during each write clock cycle when the full signal 20 is not asserted. The data is supplied to the FIFO memory 10 via write data signals 24 when a write signal 26 is asserted. The data is preferably stored into the FIFO memory 10 on an active edge of the write clock signal 16 during the write clock cycle. The data is read from the FIFO memory 10 during each read clock cycle when the empty signal 22 is not asserted. Read data signals 28 are supplied by the FIFO memory 10 after a read signal 30 is asserted during an active edge of the read clock signal 18 during the read clock cycle.

Figure 2:
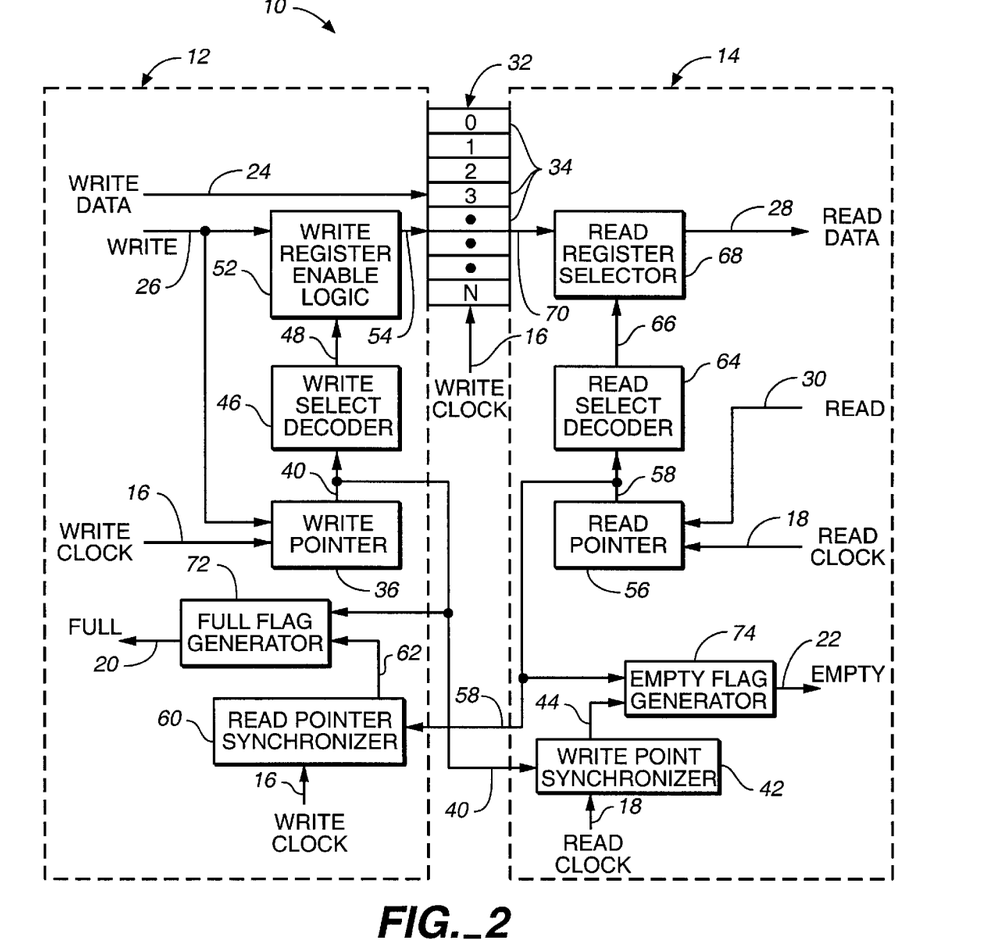
FIG. 2 is a more detailed block diagram of the FIFO memory shown in FIG. 1.

More details of the FIFO memory 10 are shown in FIG. 2. For example, the FIFO memory 10 includes a register file 32 having multiple registers 34 (data storage units) into which the data is stored and from which the stored data is read.

The FIFO memory 10 also includes a write pointer 36 which supplies a 2-hot write pointer encoded value as write pointer signal 40. The 2-hot encoded value of write pointer signal 40 corresponds to one of the FIFO registers 34 in the register file 32. An example of a 2-hot encoding sequence for a FIFO memory of size five is illustrated in a table 38 shown in FIG. 3 and described in detail below.

The write pointer 36 increments the 2-hot encoded value of the write pointer signal 40 when the write signal 26 is asserted during an active clock edge on the write clock signal 16, so that the next FIFO register 34 is activated to receive the data being written to the FIFO memory 10. The write pointer 36 supplies the write pointer signal 40 to a write pointer synchronizer 42 which is clocked by the read clock signal 18, and is thus within the read clock domain 14. The write pointer synchronizer 42 synchronizes the write pointer signal 40 to the read clock domain 14 and generates a "synchronized" and "filtered" write pointer signal 44 that is synchronized to the read clock signal 18 and filtered to correct for any errors that may have occurred during the synchronization. The write pointer synchronizer 42 is described in more detail below with reference to FIG. 4.

Figure 5:
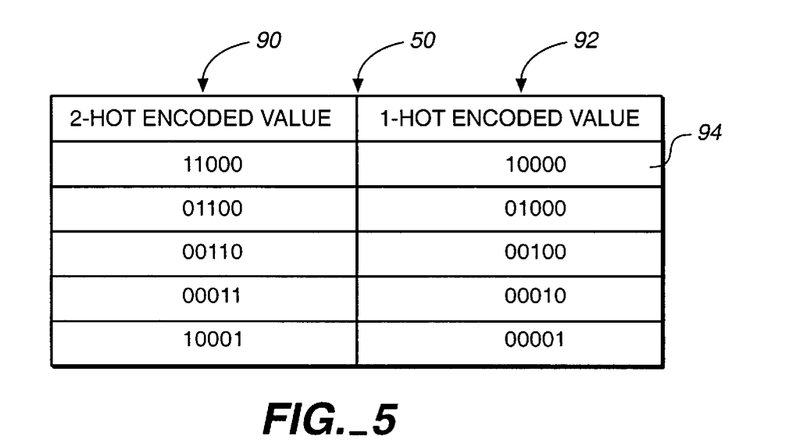
FIG. 5 is a table illustrating functionality of a write select decoder and a read select decoder incorporated in the FIFO memory shown in FIGS. 1 and 2.

The write pointer 36 also supplies the write pointer signal 40 to a write select decoder 46. The write select decoder 46 decodes the 2-hot encoded value of the write pointer signal 40 to a "1-hot" value for a write register select signal 48 in which one bit of the write register select signal 48 is set to a value of one and the remaining bits are unset to values of zero. The set bit of the write register select signal 48 selects the one of the FIFO registers 34 in the register file 32 to which data is stored. A table 50 illustrating an exemplary function of the write select decoder 46 is shown in FIG. 5 and described in detail below.

A write register enable logic 52 (described below with reference to FIG. 6) receives the write signal 26 and the write register select signal 48 from the write select decoder 46 and supplies a write enable signal 54 to the register file 32 when the write signal 26 is active. The write enable signal 54 enables the one of the FIFO registers 34 selected by the set bit of the write register select signal 48, so that the data is stored into the selected FIFO register 34. The data is preferably stored in the selected FIFO register 34 when the write enable signal 54 is asserted during an active edge of the write clock signal 16.

The FIFO memory 10 also includes a read pointer 56 which functions in a similar manner as the aforementioned write pointer 36. The read pointer 56 supplies a 2-hot encoded value as a read pointer signal 58. The read pointer 56 increments the read pointer signal 58 when the read signal 30 is asserted during an active clock edge on the read clock signal 18 in order to read the next FIFO register 34. The read pointer 56 supplies the read pointer signal 58 to a read pointer synchronizer 60 (described below with reference to FIG. 7) which is clocked by the write clock signal 16, and is thus in the write clock domain 12. The read pointer synchronizer 60 synchronizes the read pointer signal 58 to the write clock domain 12 and generates a synchronized and filtered read pointer signal 62 that is synchronized to the write clock signal 16 and filtered to correct for any errors in the 2-hot encoded value of the read pointer signal 58 that may have occurred during the synchronization.

The read pointer 56 also supplies the read pointer signal 58 to a read select decoder 64. The read select decoder 64 functions in a similar manner as the aforementioned write select decoder 46, as described below with reference to FIG. 5. The read select decoder 64 decodes the 2-hot encoded value of the read pointer signal 58 into another 1-hot value for a read register select signal 66 in which one bit of the read register select signal 66 is set to a value of one and the remaining bits are unset to a value of zero. The one set bit of the read register select signal 66 indicates one of the FIFO registers 34 in the register file 32 from which the data is read.

The read register select signal 66 is supplied to a read register selector 68. The register file 32 supplies the read register selector 68 with register data signals 70. The register data signals 70 include the values of the data stored in each FIFO register 34 of the register file 32. The read register selector 68 selects the register data signal 70 of the FIFO register 34 indicated by the read register select signal 66. For example, the read register selector 68 may include a multiplexor in which the register data signals 70 form data inputs, the read register select signal 66 forms the selection input, and the read data signals 28 form the output. The read register selector 68, thus, passes the register data signal 70 for the selected FIFO register 34 to the read data signals 28.

A "full flag" generator 72 receives the write pointer signal 40 and the synchronized filtered read pointer signal 62 and asserts the full signal 20 when the FIFO memory 10 is full. The full signal 20 is typically asserted when the 2-hot encoded value of the write pointer signal 40 is greater than the 2-hot encoded value of the synchronized filtered read pointer signal 62 by a quantity of one. In other words, the FIFO memory 10 is full when the 2-hot encoded value of the synchronized filtered read pointer signal 62 is the 2-hot encoded value that the write pointer signal 40 would be after being incremented. However, the full signal 20 may also be asserted according to any conventional method used to indicate that a FIFO memory is full.

An "empty flag" generator 74 receives the read pointer signal 58 and the synchronized filtered write pointer signal 44 and asserts the empty signal 22 when the FIFO memory 10 is empty. The empty signal 22 is asserted when the 2-hot encoded value of the read pointer signal 58 is equal to the 2-hot encoded value of the synchronized filtered write pointer signal 44. However, the empty signal 22 may also be asserted according to any conventional method used to indicate that a FIFO memory is empty.

Figure 3:
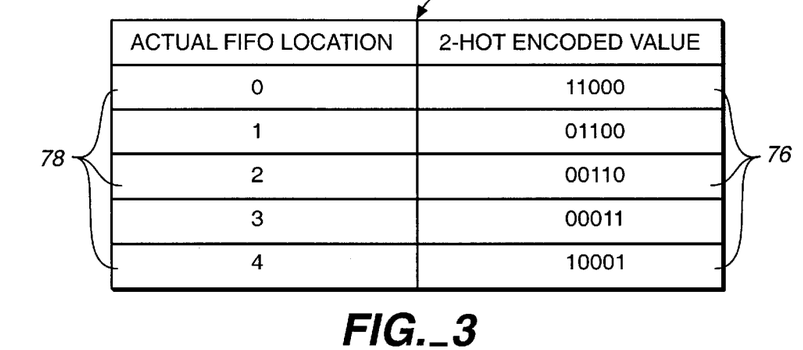
FIG. 3 is a table illustrating functionality of a write pointer and a read pointer incorporated in FIFO memory shown in FIGS. 1 and 2.

For the 2-hot encoding sequence shown in Table 38 in FIG. 3, 2-hot encoded values 76 have a number of bits equal to the number of FIFO registers 34 (FIG. 2), whether even or odd. Each 2-hot encoded value 76 corresponds to an actual FIFO location 78, or register 34. In the illustrated 2-hot encoding format, two adjacent bits in each 2-hot encoded value 76 have a value of one, and the remaining bits have a value of zero. When the 2-hot encoded value 76 for the FIFO memory location 78 is incremented or decremented to point to the next or previous FIFO registers 34, respectively, two bits of the 2-hot encoded value 76 change value, but one of the set bits having a value of one remains unchanged. For example, when the 2-hot encoded value 76 having a binary value of 11000b is incremented to 01100b, the second leftmost bit is set to a value of one unchanged between the initial encoded value and the incremented encoded value. The bit value that remains unchanged when the 2-hot encoded value 76 is incremented or decremented is typically referred to as the "anchor bit." The two bits of the encoded value that change when the 2-hot encoded value 76 is incremented or decremented straddle the anchor bit. The bit to the left of the anchor bit transitions from a set value of one to an unset value of zero while the bit to the right of the anchor bit transitions from an unset value of zero to a set value of one.

The write pointer 36 (FIG. 2) sequences through the 2-hot encoded values 76 with "wrap around." For example, assuming the write pointer 36 is initialized to the value of 11000b, it sequentially counts through values 01100b, 00110b and 00011b. The write pointer 36 then wraps around and counts to values 10001b and 11000b and continues to count in the aforementioned manner. In this case, the bits of the 2-hot encoded value 76 wrap around at the leftmost bit and the rightmost bit in which the leftmost bit and the rightmost bit are conceptually "adjacent" to each other. For example, in the 2-hot encoded value 76 having a binary value of 10001b, the leftmost bit has a value of one and is "adjacent" to the rightmost bit which also has a value of one.

Figure 4:
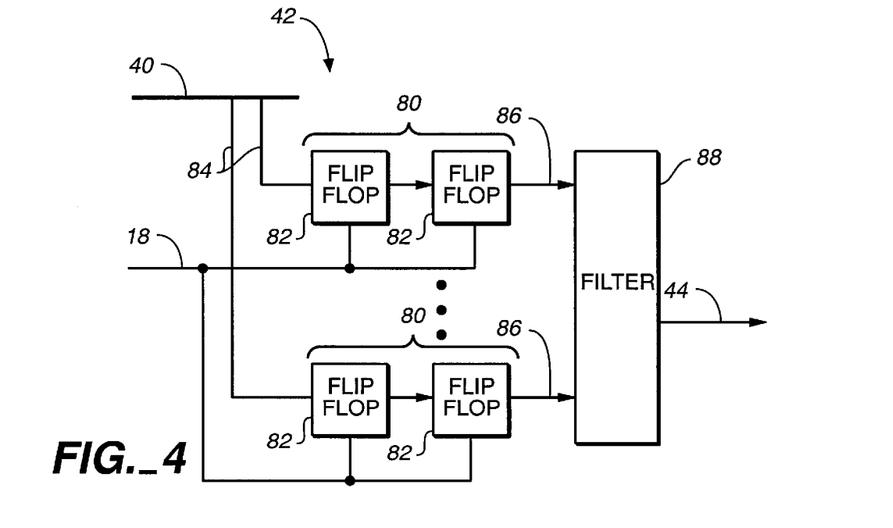
FIG. 4 is a block diagram of a write pointer synchronizer incorporated in the FIFO memory shown in FIGS. 1 and 2.

Preferably, the write pointer synchronizer 42, as shown in FIG. 4, includes sets 80 of two or more flip-flops 82 connected in series and clocked by the read clock signal 18 to synchronize the write pointer signal 40. (Other conventional methods of synchronizing signals to a clock domain may also be used to synchronize the write pointer signal 40 to the read clock signal 18.) The flip-flops 82 of each set 80 resolve a corresponding bit 84 of the write pointer signal 40 to a definite value even when the write pointer signal 40 is transitioning during an active edge of the read clock signal 18. The last flip-flop 82 in each set 80 of flip-flops 82 supplies a synchronized write pointer signal 86 to a filter 88 which performs error correction on the synchronized write pointer signal 86, as described below with reference to FIG. 8. The filter 88 supplies the synchronized filtered write pointer signal 44 having a valid 2-hot encoding value.

The table 50, as shown in FIG. 5, represents the functionality of the write select decoder 46 (FIG. 2) and the read select decoder 64 (FIG. 2) for a FIFO memory 10 (FIGS. 1 and 2) of size five. Each 2-hot encoded value 90 of the write pointer signal 40 (FIG. 2) and of the read pointer signal 58 (FIG. 2) is decoded by the write select decoder 46 and the read select decoder 64, respectively, into a unique 1-hot encoded value 92 for the write register select signal 48 and the read register select signal 66, respectively. The bit set to a value of one in the 1-hot encoded value 92 is used to select the FIFO register 34 (FIG. 2) to which the data is to be added or from which the data is to be read. For example, the 1-hot encoded value 94 of 10000b selects the FIFO location 96 (FIG. 3) of zero.

Figure 6:
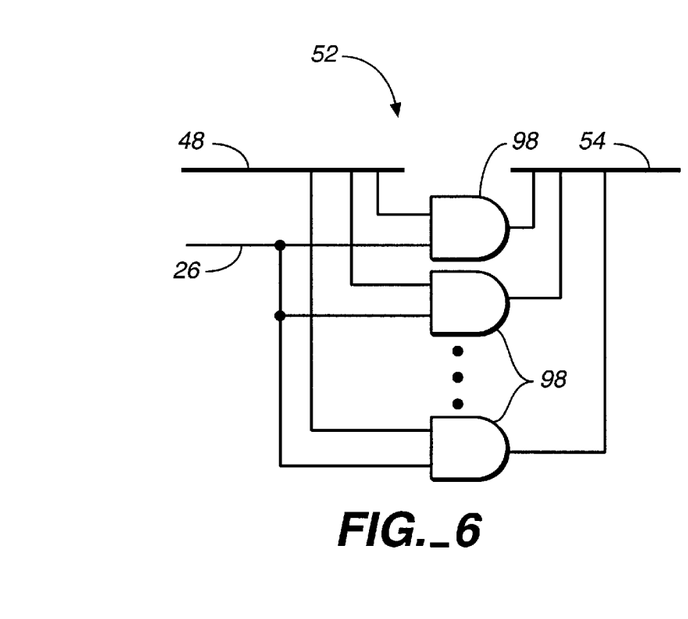
FIG. 6 is a block diagram of a write enable logic circuit incorporated in the FIFO memory shown in FIGS. 1 and 2.

The write register enable logic 52, as shown in FIG. 6, preferably includes multiple AND logic gates 98 for generating the write enable signal 54 from write register select signal 48 which were encoded using 1-hot encoding, as shown in FIG. 5. The write register select signal 48, thus, asserts a value of one on the input of only one selected AND gate 98. The write signal 26 forms the other input to the AND gates 98. Therefore, only one of the bits of the write enable signal 54, at the output of the selected AND gate 98, is asserted when the write register select signal 48 and the write signal 26 at the inputs of the selected AND gate 98 are active. The asserted bit of the write enable signal 54 enables the selected FIFO register 34 (FIG. 2) for storing data while the remaining bits of the write enable signal 54, which are not asserted, disable the other FIFO registers 34 for storing data.

Figure 7:
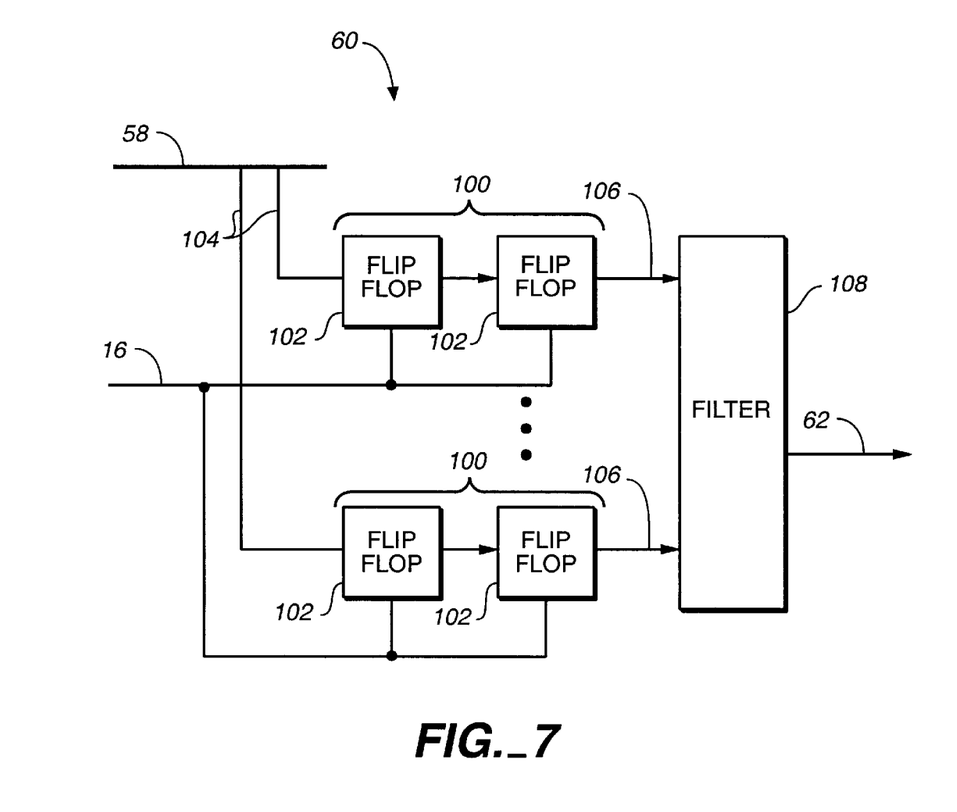
FIG. 7 is a block diagram of a read pointer synchronizer incorporated in the FIFO memory shown in FIGS. 1 and 2.

Similar to the write pointer synchronizer 42 (FIGS. 2 and 4), the read pointer synchronizer 60, as shown in FIG. 7, includes sets 100 of two or more flip-flops 102 connected in series and clocked by the write clock signal 16 to synchronize the read pointer signal 58. Other conventional methods of synchronizing signals to a clock domain may also be used to synchronize the read pointer signal 58 to the write clock signal 16. The flip-flops 102 resolve the bits 104 of the read pointer signal 58 to a definite value even when the bits 104 of the read pointer signal 58 are transitioning between logic states. The last flip-flop 102 in each set 100 of flip-flops 102 supplies a synchronized read pointer signal 106 to a filter 108, similar to the filter 88 (FIG. 4). The filter 108 corrects any errors in the synchronized read pointer signal 106 to produce the synchronized filtered read pointer signal 62 in the manner described with reference to FIG. 8 below.

Figure 8:
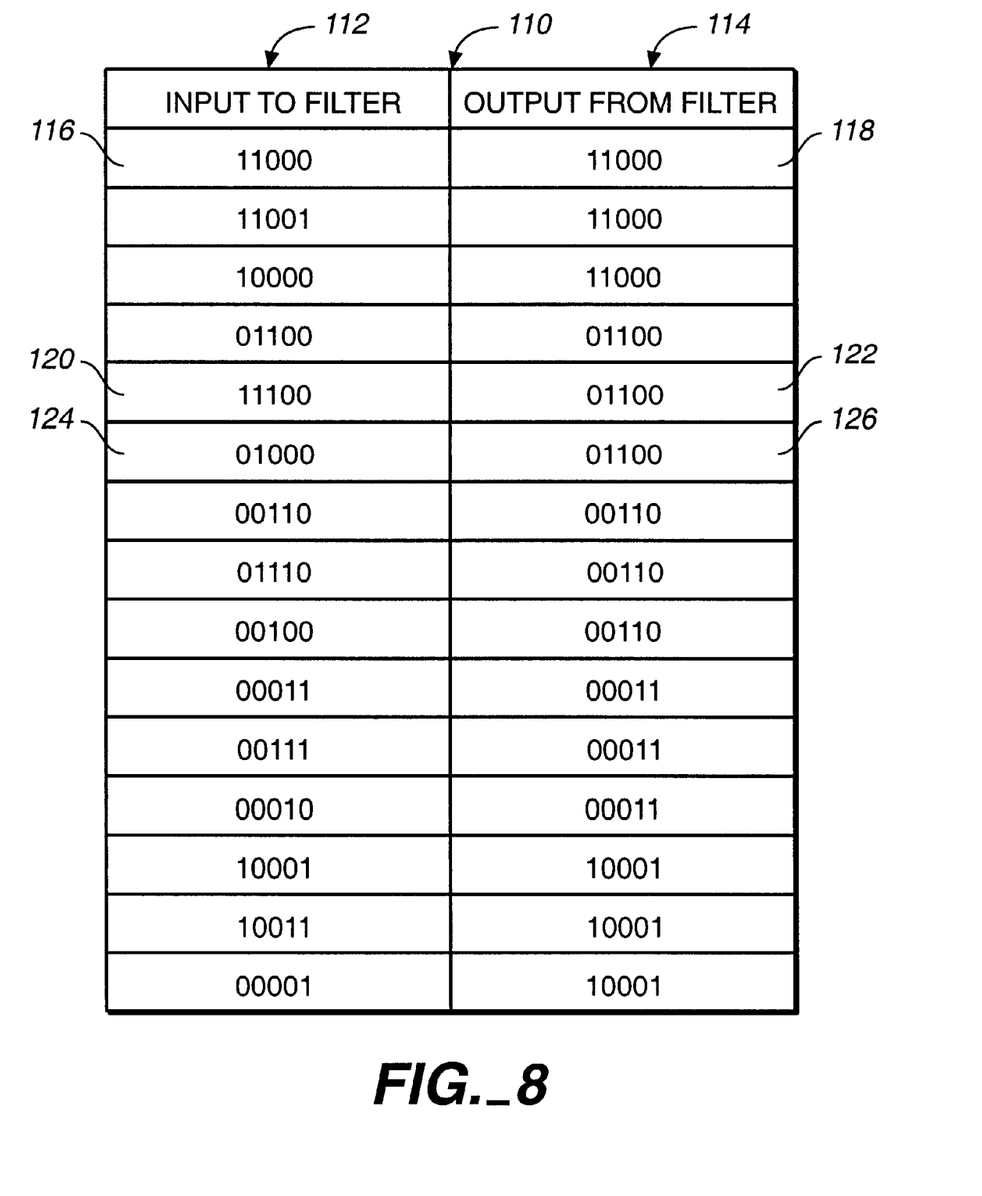
FIG. 8 is a table illustrating functionality of a filter incorporated in the synchronizers shown in FIGS. 4 and 7.

A filter table 110 representing the functionality of the filters 88 and 108 (FIGS. 4 and 7, respectively) for a FIFO memory 10 (FIGS. 1 and 2) of size five is shown in FIG. 8. For each given input 112 (e.g. synchronized write pointer signal 86, FIG. 4, and synchronized read pointer signal 106, FIG. 7) to the filter 88 or 108, the corresponding output 114 (e.g. synchronized filtered write pointer signal 44, FIGS. 2 and 4, and synchronized filtered read pointer signal 62, FIGS. 2 and 7) is shown. For the inputs 112 for which the flip-flops 82 or 102 (FIG. 4 or 7, respectively) produced two adjacent bits set to a value of one and the remaining bits set to a value of zero, the filter 88 or 108 does not change the values for the output signals 114. For example, the input 112 of 11000b in location 116 of the filter table 110 is not changed by the filter 88 or 108, as shown by the output 114 of 11000b in location 118 of the filter table 110.

For an input 112 that has three adjacent bits (e.g. at location 120 of filter table 110) having a value of one and the remaining bits having a value of zero, the leftmost bit having a value of one was evidently transitioning from a previous value of one to a subsequent value of zero, but was resolved to the previous value of one by the flip-flops 82 or 102 (FIG. 4 or 7, respectively) of the write or read pointer synchronizer 42 or 60 (FIG. 4 or 7), respectively. The rightmost bit having a value of one was evidently transitioning from a previous value of zero to a subsequent value of one and was resolved to the subsequent value of one by the flip-flops 82 or 102 of the write or read pointer synchronizer 42 or 60, respectively. Therefore, the filter 88 or 108 (FIG. 4 or 7) changes the leftmost bit having the previous value of one to the subsequent value of zero to form a filtered, or corrected, 2-hot encoded value to which the write or read pointer signal 40 or 58 (FIG. 4 or 7) was transitioning. For example, the input 112 of 11100b in location 120 of the filter table 110 is changed by the filter 88 or 108 to an output 114 of 01100b as shown in location 122 of the filter table 110.

For an input 112 that has only one bit (e.g. at location 124 of filter table 110) set to a value of one and the remaining bits having a value of zero, the unset bit immediately to the left of the set bit was evidently transitioning from a previous value of one to a subsequent value of zero and was resolved to the subsequent value of zero by the flip-flops 82 or 102 (FIG. 4 or 7) of the write or read pointer synchronizer 42 or 60 (FIG. 4 or 7), respectively. The unset bit immediately to the right of the set bit was evidently transitioning from a previous value of zero to a subsequent value of one, but was resolved to the previous value of zero by the flip-flops 82 or 102 of the write or read pointer synchronizer 42 or 60, respectively. Therefore, the filter 88 or 108 (FIG. 4 or 7) changes the unset bit that is immediately to the right of the set bit to a value of one to form a filtered, or corrected, 2-hot encoded value to which the write or read pointer signal 40 or 58 (FIG. 4 or 7) was transitioning. For example, the input 112 of 01000b in location 124 of the filter table 110 is changed by the filter 88 or 108 to an output 114 of 01100b as shown in location 126 of the filter table 110.

By encoding the contents of the write and read pointers 36 and 56 (FIG. 2) using a 2-hot encoding scheme and by using write and read synchronizers 42 and 60 to synchronize the write and read pointer signals 40 and 58, respectively, data can be stored in the FIFO memory 10 during each cycle of the write clock signal 16 (FIGS. 1 and 2) and can be read from the FIFO memory 10 during each cycle of the read clock signal 18 (FIGS. 1 and 2) without using handshaking signals between the clock domains 12 and 14 (FIGS. 1 and 2). The full signal 20 and the empty signal 22 are synchronized to the write clock signal 16 and the read clock signal 18 respectively and supply status information to the clock domains 12 and 14. The 2-hot encoding method allows the FIFO memory 10 to contain any number of FIFO registers 34, unlike gray code encoding methods, which require an even number of FIFO registers 34 in the FIFO memory 10. Many other advantages and improvements will be apparent after gaining an understanding of the present invention.

The presently preferred embodiment of the present invention has been shown and described with a degree of particularity. These descriptions are of preferred examples of the invention. In distinction to its preferred examples, it should be understood that the scope of the present invention is defined by the scope of the following claims, which should not necessarily be limited to the detailed description of the preferred embodiment set forth above.

The invention claimed is:

1. A digital logic circuit for transferring information across a synchronization boundary comprising:
    a first clock domain including first circuitry operating at a first clock speed to transfer the information to a second clock domain;
    the second clock domain separated from the first clock domain by the synchronization boundary, including second circuitry operating at a second clock speed to receive the information from the first clock domain;
    a common circuitry operating partially in the first clock domain and partially in the second clock domain to contain the information being transferred therebetween, the common circuitry including a plurality of data storage units containing the information being transferred, the data storage units including an input data storage unit into which the information is transferred by the first circuitry and an output data storage unit from which the information is transferred by the second circuitry, the input and output data storage units being switched among the data storage units;
    an indicator containing a digital signal synchronized to the first clock domain, the digital signal having two indicator bits that indicate one of the input data storage unit or the output data storage unit, one of the two indicator bits of the digital signal remaining unchanged upon switching which of the data storage units is the one of the input data storage unit or the output data storage unit; and
    a synchronizer connected to the indicator to receive the digital signal synchronized to the first clock domain, the synchronizer synchronizing the digital signal to the second clock domain.

2. A digital logic circuit as defined in claim 1, wherein the indicator is a first indicator, the digital signal is a first digital signal, the two indicator bits of the first digital signal indicate the input data storage unit, the unchanged indicator bit of the first digital signal remains unchanged upon switching which of the data storage units is the input data storage unit, and the synchronizer is a first synchronizer, further comprising:
    a second indicator containing a second digital signal synchronized to the second clock domain, the second digital signal having two indicator bits that indicate the output data storage unit from which the information is transferred by the second circuitry, one of the two indicator bits of the second digital signal remaining unchanged upon switching which of the data storage units is the output data storage unit;
    a second synchronizer connected to the second indicator to receive the second digital signal synchronized to the second clock domain, the second synchronizer synchronizing the second digital signal to the first clock domain.

3. A digital logic circuit as defined in claim 2 wherein:
    the first synchronizer includes first resolving circuitry and first converting circuitry connected together for synchronizing the first digital signal to the second clock domain;
    the first resolving circuitry resolves the first digital signal received from the first clock domain into a first synchronized digital signal synchronized to the second clock domain in which one or more of three bits, including the unchanged indicator bit, are set and remaining bits are unset;
    the first converting circuitry converts the one or more of three set bits of the first synchronized digital signal to two set bits which indicate the input data storage unit synchronized to the second clock domain;
    the second synchronizer includes second resolving circuitry and second converting circuitry connected together for synchronizing the second digital signal to the first clock domain;
    the second resolving circuitry resolves the second digital signal received from the second clock domain into a second synchronized digital signal synchronized to the first clock domain in which one or more of three bits, including the unchanged indicator bit, are set and remaining bits are unset; and
    the second converting circuitry converts the one or more of three set bits of the second synchronized digital signal to two set bits which indicate the output data storage unit synchronized to the first clock domain.

4. A digital logic circuit as defined in claim 2 wherein:
    the indicator bit of the first digital signal that remains unchanged upon changing which of the data storage units is the input data storage unit is a first indicator bit of the first digital signal, the other one of the indicator bits of the first digital signal is a second indicator bit of the first digital signal, and remaining bits of the first digital signal are remainder bits of the first digital signal;

the indicator bit of the second digital signal that remains unchanged upon changing which of the data storage units is the output data storage unit is a first indicator bit of the second digital signal, the other one of the indicator bits of the second digital signal is a second indicator bit of the second digital signal, and remaining bits of the second digital signal are remainder bits of the second digital signal;

the second indicator bit of the first digital signal and one of the remainder bits of the first digital signal change logic states upon changing which of the data storage units is the input data storage unit; and the second indicator bit of the second digital signal and one of the remainder bits of the second digital signal change logic states upon changing which of the data storage units is the output data storage unit.

5. A digital logic circuit as defined in claim 2 wherein the first and second digital signals include 2-hot encoded digital values.

6. A digital logic circuit as defined in claim 2 further comprising:
a first decoder that decodes the first digital signal having the two indicator bits into an input select signal having one indicator bit that activates the input data storage unit; and
a second decoder that decodes the second digital signal having the two indicator bits into an output select signal having one indicator bit that activates the output data storage unit.

7. A digital logic circuit as defined in claim 2 wherein:
the common circuitry includes a first-in-first-out (FIFO) memory in which the input and output data storage units are switched sequentially through the data storage units in a FIFO manner;
the information is added to the data storage units sequentially at the first clock speed; and
the information is read from the data storage units sequentially at the second clock speed.

8. A digital logic circuit as defined in claim 2 wherein the first and second digital signals each have a total number of bits equal to a total number of the data storage units.

9. A digital logic circuit as defined in claim 8 wherein the total number of the data storage units is odd.

10. A digital logic circuit as defined in claim 2 wherein:
the information is transferred into the data storage units in the first clock domain on each clock cycle of the first clock domain; and
the information is transferred from the data storage units in the second clock domain on each clock cycle of the second clock domain.

11. A digital logic circuit as defined in claim 2 wherein:
the two indicator bits of the first digital signal are set to a value of one and remaining bits of the first digital signal are set to a value of zero; and
the two indicator bits of the second digital signal are set to a value of one and remaining bits of the second digital signal are set to a value of zero.

12. A method for synchronizing digital signals across a synchronization boundary between first and second clock domains, a common circuitry operating partially in the first clock domain and partially in the second clock domain to transfer information therebetween, comprising the steps of:

encoding a digital signal with two bits set to indicate a selected portion of the common circuitry through which the information is transferred, the digital signal being synchronized in the first clock domain, one of the two set bits remaining unchanged upon switching the portion of the common circuitry that is indicated by the two set bits; and synchronizing the digital signal to the second clock domain to supply the second clock domain with a corresponding synchronized digital signal also encoded with two bits set to indicate the portion of the common circuitry through which the information is transferred.

13. A method as defined in claim 12, wherein the digital signal is a first digital signal, the portion of the common circuitry through which the information is transferred is a first portion of the common circuitry through which the information is transferred, and the synchronized digital signal is a first synchronized digital signal, comprising the further steps of:

encoding a second digital signal with two bits set to indicate a second selected portion of the common circuitry through which the information is transferred, the second digital signal being synchronized in the second clock domain, one of the two set bits of the second digital signal remaining unchanged upon switching the second portion of the common circuitry that is indicated by the two set bits of the second digital signal;

synchronizing the second digital signal to the first clock domain to supply the first clock domain with a corresponding second synchronized digital signal also encoded with two bits set to indicate the second portion of the common circuitry through which the information is transferred.

14. A method as defined in claim 13 comprising the further steps of:
resolving the first digital signal into a first preliminary digital signal synchronized to the second clock domain, the first preliminary digital signal having one or more of three set bits;
converting the first preliminary digital signal into the first synchronized digital signal by changing the one or more of three set bits of the first preliminary digital signal into two set bits that correspond to the two set bits of the first digital signal;
resolving the second digital signal into a second preliminary digital signal synchronized to the first clock domain, the second preliminary digital signal having one or more of three set bits; and
converting the second preliminary digital signal into the second synchronized digital signal by changing the one or more of three set bits of the second preliminary digital signal into two set bits that correspond to the two set bits of the second digital signal.

15. A method as defined in claim 13 comprising the further steps of:
converting the first digital signal having two set bits into a first select signal having one set bit which activates the first portion of the common circuitry through which the information is transferred; and
converting the second digital signal having two set bits into a second select signal having one set bit which activates the second portion of the common circuitry through which the information is transferred.

16. A method as defined in claim 13, wherein the one of the two set bits of the first digital signal that remains unchanged upon switching the first portion of the common circuitry is a first set bit of the first digital signal, the other one of the two set bits of the first digital signal is a second set bit of the first digital signal, remaining bits of the first digital signal are unset bits of the first digital signal, the one of the two set bits of the second digital signal that remains unchanged upon switching the second portion of the common circuitry is a first set bit of the second digital signal, the other one of the two set bits of the second digital signal is a second set bit of the second digital signal, and remaining bits of the second digital signal are unset bits of the second digital signal, comprising the further steps of:

switching the first portion of the common circuitry that is indicated by the two sets bits of the first digital signal by unsetting the second set bit of the first digital signal and setting one of the unset bits of the first digital signal; and     switching the second portion of the common circuitry that is indicated by the two sets bits of the second digital signal by unsetting the second set bit of the second digital signal and setting one of the unset bits of the second digital signal.

17. A method as defined in claim 13 comprising the further steps of:

encoding the first digital signal as a first 2-hot encoded digital value; and     encoding the second digital signal as a second 2-hot encoded digital value.

18. A method as defined in claim 13, wherein the common circuitry includes a first-in-first-out (FIFO) memory for temporarily containing the information that is being transferred between the first and second clock domains, comprising the further steps of:

comparing the first digital signal with the second synchronized digital signal;

adding the information to the FIFO memory in the first clock domain when the comparison of the first digital signal with the second digital signal indicates that the FIFO memory has space for additional information;

comparing the second digital signal with the first synchronized digital signal;

reading the information from the FIFO memory in the second clock domain when the comparison of the second digital signal with the first synchronized digital signal indicates that the FIFO memory contains information to be read.

19. A method as defined in claim 13 wherein the common circuitry includes a plurality of data storage units, the first and second portions of the common circuitry include first and second ones of the data storage units, and a total number of the data storage units is odd.

20. A method as defined in claim 13 comprising the further steps of:

transferring the information into the common circuitry in the first clock domain on each clock cycle of the first clock domain; and     transferring the information from the common circuitry in the second clock domain on each clock cycle of the second clock domain.

* * * * *